United States Patent
Agapiou et al.

(10) Patent No.: US 6,346,586 B1
(45) Date of Patent: Feb. 12, 2002

(54) METHOD FOR PREPARING A SUPPORTED CATALYST SYSTEM AND ITS USE IN A POLYMERIZATION PROCESS

(75) Inventors: Agapios K. Agapiou; Chi-I Kuo, both of Humble; David M. Glowczwski; Steven K. Ackerman, both of Baytown, all of TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/426,779

(22) Filed: Oct. 22, 1999

(51) Int. Cl.⁷ .................................................. C08F 4/52
(52) U.S. Cl. ....................... 526/160; 526/129; 526/901; 526/159
(58) Field of Search .............................. 526/129, 901, 526/160, 159

(56) References Cited

U.S. PATENT DOCUMENTS 5,554,704 A    9/1996  Burkhardt et al. .......... 526/153
5,914,289 A  * 6/1999  Razavi ....................... 502/107

FOREIGN PATENT DOCUMENTS

| EP | 0 878 486 A1 | 11/1998 |
|---|---|---|
| WO | WO 96/35729 | 11/1996 |

* cited by examiner

Primary Examiner—David W. Wu
Assistant Examiner—William Cheung
(74) Attorney, Agent, or Firm—Jaimes Sher; Lisa Kimes Jones; Darrell E. Warner

(57) ABSTRACT

The present invention relates to a supported catalyst composition and a method for making the supported catalyst composition and its use in a process for polymerizing olefin(s). In particular, the invention is directed to a method for making a supported catalyst composition by combining a heated bulky ligand metallocene-type catalyst system with a carrier or an optionally heated carrier.

7 Claims, No Drawings

METHOD FOR PREPARING A SUPPORTED CATALYST SYSTEM AND ITS USE IN A POLYMERIZATION PROCESS

FIELD OF THE INVENTION

The present invention relates to a method for preparing a supported catalyst system and for its use in a process for polymerizing olefin(s). In particular, the invention is directed to a method for preparing a supported bulky ligand metallocene-type catalyst system.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene-type catalyst systems. In particular, in a slurry or gas phase process where typically a supported catalyst system is used, there are a variety of different methods described in the art for supporting bulky ligand metallocene-type catalyst systems.

Illustrative methods for producing supported bulky ligand metallocene-type catalyst systems include: U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene-type catalyst systems; PCT publication WO 97/06186 published Feb. 20, 1997 teaches removing inorganic and organic impurities after formation of the metallocene-type catalyst itself; PCT publication WO 97/15602 published May 1, 1997 discusses readily supportable metal complexes; U.S. Pat. No. 4,937,217 generally describes a mixture of trimethylaluminum and triethylaluminum added to an undehydrated silica then adding a metallocene catalyst; EP-308177-B1 generally describes adding a wet monomer to a reactor containing a metallocene, trialkylaluminum and undehydrated silica; U.S. Pat. Nos. 4,912,075, 4,935,397 and 4,937,301 generally relate to adding trimethylaluminum to an undehydrated silica and then adding a metallocene to form a dry supported catalyst; U.S. Pat. No. 4,914,253 describes adding trimethylaluminum to undehydrated silica, adding a metallocene and then drying the catalyst with an amount of hydrogen to produce a polyethylene wax; U.S. Pat. Nos. 5,008,228, 5,086,025 and 5,147,949 generally describe forming a dry supported catalyst by the addition of trimethylaluminum to a water impregnated silica to form alumoxane in situ and then adding the metallocene; U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component; U.S. Pat. No. 5,238,892 describes forming a dry supported catalyst by mixing a metallocene with an alkyl aluminum then adding undehydrated silica; and U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

U.S. Pat. No. 5,914,289 discusses making a supported catalyst system by combining a specific bulky ligand metallocene-type catalyst system with alumoxane to form a reaction product in the presence of a carrier and then heating the reaction product/carrier combination to a high temperature.

While all these methods have been described in the art, a need for an improved method for preparing a supported bulky-ligand metallocene-type catalysts has been discovered.

SUMMARY OF THE INVENTION

This invention provides a method of making a new and improved supported bulky ligand metallocene-type catalyst system and for its use in a polymerizing process.

In one embodiment, the invention is directed to a method for making a supported catalyst system comprising the steps of (a) heating a composition comprising a bulky ligand metallocene-type catalyst compound; and (b) combining the heated composition with a carrier. In this embodiment, the carrier is optionally heated and combined with the heated composition, and then dried.

In another aspect, the method comprises the steps of (a) forming a reaction product comprising a bulky ligand metallocene-type catalyst compound and an activator; (b) heating the reaction product; (c) combining a carrier, optionally heating the carrier, with the reaction product.

In yet another embodiment, the invention is directed to a method for making a supported catalyst system comprising the steps of (a) heating an activated bulky ligand metallocene-type catalyst; (b) heating a carrier; and (c) combining the heated carrier and the heated activated bulky ligand metallocene-type catalyst.

In a further embodiment, the invention relates to a method for preparing a supported catalyst system comprising the steps of (a) heating a composition comprising a bulky ligand metallocene-type catalyst compound at a first temperature; (b) heating a carrier at a second temperature; and (c) combining (a) and (b) at a third temperature. The first, second and third temperatures are the same or different.

In another embodiment, the invention is directed to a process for polymerizing olefin(s), particularly in a gas phase or slurry phase process, utilizing any one of the supported catalyst systems prepared above.

DETAILED DESCRIPTION OF THE INVENTION

Introduction

The invention is directed toward a method for making a supported catalyst system. It has been suprisingly discovered that by combining a heated bulky ligand metallocene-type catalyst system with a carrier, optionally heating the carrier, results in an increase in catalyst productivity. This method is particular enhanced when the bulky ligand metallocene-type catalyst compound has reduced solubility as compared for example with a very basic unsubstituted bulky ligand metallocene-type catalyst compound, i.e. bis (cyclopentadienyl)zirconium dichloride. The method of the invention is especially well suited for use with bridged bulky ligand metallocene-type catalyst compounds. Thus, as a result the improved method of the invention provides a way to increase catalyst productivities to a commercially acceptable level with improved reactor process operability.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably η$^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably η$^3$-bonding to M and most preferably η$^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene-type catalyst compounds of the invention include those of formula (I) where $L^A$ and $L^B$ are bridged to each other by at least one bridging group, A, such that the formula is represented by $$L^A A L^B M Q_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (II) have two or more bridging groups A (EP 664 301 B1).

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0,1 or 2. In formula (III) above, $L^C$, A and J form a fused ring system. In an embodiment, $L^C$ of formula (III) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR—then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, U.S. Pat. No. 6,103,657 which is herein incorporated by reference. In another embodiment, the bulky ligand metallocene-type catalyst compounds are those described in PCT publications WO 99/01481 and WO 98/42664, which are fully incorporated herein by reference.

In one embodiment, the bulky ligand metallocene-type catalyst compound is represented by the formula:

$$((Z)XA_t(YJ))_qMQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384 and U.S. Pat. No. 5,851,945, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene-type catalysts are described as bis(hydroxy aromatic nitrogen ligands) in U.S. Pat. No. 5,852,146, which is incorporated herein by reference. Other metallocene-type catalysts containing one or more Group 15 atoms include those described in WO 98/46651, which is herein incorporated herein by reference. Still another metallocene-type bulky ligand metallocene-type catalysts include those multinuclear bulky ligand metallocene-type catalysts as described in WO 99/20665, which is incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, incorporated herein by reference) and mixtures thereof.

Activator and Activation Methods for the Bulky Ligand Metallocene-Type Catalyst Compounds The above described bulky ligand metallocene-type catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene-type catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst compound.

In one embodiment, an activation method using ionizing ionic compounds not containing an active proton but capable of producing both a bulky ligand metallocene-type catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994 abandoned May 23, 1995, all of which are herein fully incorporated by reference.

Other activators include those described in PCT publication WO 98/07515 such as tris(2, 2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene-type catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane)benzimidazolide), which are herein incorporated by reference.

It is also within the scope of this invention that the above described bulky ligand metallocene-type catalyst compounds can be combined with one or more of the catalyst compounds represented by formulas (I) through (V) with one or more activators or activation methods described above.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene-type catalyst compounds of the invention have at least one fluoride or fluorine containing leaving group as described in U.S. application Ser. No. 09/191,916 filed Nov. 13, 1998 pending.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Supports, Carriers and General Supporting Techniques

The above described bulky ligand metallocene-type catalyst compounds and catalyst systems may be combined with one or more support materials or carriers using one of the support methods well known in the art or as described below. For example, in a most preferred embodiment, a bulky ligand metallocene-type catalyst compound or catalyst system is in a supported form, for example deposited on, contacted with, vaporized with, bonded to, or incorporated within, adsorbed or absorbed in, or on, a support or carrier.

The terms "support" or "carrier" are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina and mixtures thereof. Other useful supports include magnesia, titania, zirconia, magnesium chloride, montmorillonite (EP-B1 0 511 665), phyllosilicate, zeolites, talc, clays and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, which is herein incorporated by reference.

It is preferred that the carrier, most preferably an inorganic oxide, has a surface area in the range of from about 10 to about 700 m$^2$/g, pore volume in the range of from about 0.1 to about 4.0 cc/g and average particle size in the range of from about 5 to about 500 $\mu$m. More preferably, the surface area of the carrier is in the range of from about 50 to about 500 m$^2$/g, pore volume of from about 0.5 to about 3.5 cc/g and average particle size of from about 10 to about 200 $\mu$m. Most preferably the surface area of the carrier is in the range is from about 100 to about 1000 m$^2$/g, pore volume from about 0.8 to about 5.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 450 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. No. 271,598 filed Jul. 7, 1994 U.S. Pat. No. 5,468,702 Nov. 21, 1995 and Ser. No. 788,736 filed Jan. 23, 1997 U.S. Pat. No. 6,090,740 Jul. 18, 2000 and PCT publications WO 95/32995, WO 95/14044, WO 96/06187 and WO 97/02297, and EP-B1-0 685 494 all of which are herein fully incorporated by reference.

There are various other methods in the art for supporting a polymerization catalyst compound or catalyst system of the invention. For example, the bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the bulky ligand metallocene-type catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported bulky ligand metallocene-type catalyst system that includes a surface modifier that is used in the preparation of the supported catalyst system as described in PCT publication WO 96/11960, which is herein fully incorporated by reference. The catalyst systems of the invention can be prepared in the presence of an olefin, for example hexene-1.

In another embodiment, the bulky ligand metallocene-type catalyst system can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998 pending.

A preferred method for producing a supported bulky ligand metallocene-type catalyst system is described below and is described in U.S. application Ser. No. 265,533, filed Jun. 24, 1994 abandoned Apr. 18, 1995 and Ser. No. 265,532, filed Jun. 24, 1994 abandoned Mar. 29, 1995 and PCT publications WO 96/00245 and WO 96/00243 both published Jan. 4, 1996, all of which are herein fully incorporated by reference. In this preferred method, the bulky ligand metallocene-type catalyst compound is slurried in a liquid to form a metallocene solution and a separate solution is formed containing an activator and a liquid. The liquid may be any compatible solvent or other liquid capable of forming a solution or the like with the bulky ligand metallocene-type catalyst compounds and/or activator of the invention. In the most preferred embodiment the liquid is a cyclic aliphatic or aromatic hydrocarbon, most preferably toluene. The bulky ligand metallocene-type catalyst compound and activator solutions are mixed together heated and added to a porous support, optionally a heated porous support, or a porous support, optionally a heated porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration,* Vol. 28, No. 3, Analytical Chemistry 332–334 (March, 1956).

The mole ratio of the metal of the activator component to the metal of the supported bulky ligand metallocene-type catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the bulky ligand metallocene-type catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the supported bulky ligand metallocene-type catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Method of Preparing the Supported Catalyst System of the Invention

The method for making the supported catalyst system of the invention generally involves the combining, contacting, vaporizing, blending, bonding and/or mixing any of the above described bulky ligand metallocene-type catalyst compounds using any of the above described methods of supporting them, wherein the bulky ligand metallocene-type catalyst compound and/or reaction product of an activator and a bulky ligand metallocene-type catalyst compound and/or an activated bulky ligand metallocene-type catalyst is heated and then combined with a carrier, optionally a heated carrier. In a preferred embodiment, the bulky ligand metallocene-type catalyst compound is combined with an activator to form a reaction product that is then heated and added to a carrier, optionally a heated carrier. The methods of heating supported catalyst system components (including warming) are well known in the art.

In one preferred embodiment, at least one bulky ligand metallocene-type catalyst compound and at least one activator are combined to form a mixture; the mixture is heated to a first temperature from 25° C. to 150° C., preferably from 50° C. to 125° C., more preferably from 75° C. to 100° C., most preferably from 80° C. to 100° C.; and the heated mixture is combined with a carrier, preferably the carrier is at ambient conditions, at a third temperature that is the same or different from the first and/or second temperature.

In another preferred embodiment, at least one bulky ligand metallocene-type catalyst compound and at least one activator are combined to form a mixture; the mixture is heated to a first temperature from 25° C. to 150° C., preferably from 50° C. to 125° C., more preferably from 75° C. to 100° C., most preferably from 80° C. to 100° C.; a carrier is heated to a second temperature in the range of from 30° C. to 100° C., preferably from 40° C. to 100° C., more preferably from 70° C. to 100° C., most preferably from 85° C. to 100° C.; and the heated carrier and the heated mixture are combined at a third temperature that is the same or different from the first and/or second temperature. Preferably in this embodiment, the first, second and third temperatures are substantantially the same, in the range of from 50° C. to 125° C., preferably from 65° C. to 100° C. more preferably from 75° C. to 100° C. most preferably from 85° C. to 100° C. In one embodiment, the heated carrier and the heated mixture after being combined are maintained at a temperature greater than 50° C., preferably greater than 70° C., more preferably greater than 80° C. and most preferably greater than 85° C., for a period of time from about 30 seconds to about 12 hours, preferably from about 1 minute to about 6 hours, more preferably from 10 minutes to about 4 hours, and most preferably from about 30 minutes to about 3 hours. In a further embodiment, after the heated mixture and carrier, optionally the heated carrier, have been combined at a specified temperature and time period, the combination is then dried to a free flowing powder by any of the techniques well known in the art.

Other embodiments are contemplated by the present invention, for example (1) heating a bulky ligand metallocene-type catalyst compound in a solution and adding it to a carrier that has been optionally heated, followed by then adding a activator that is optionally heated; (2) adding an activator, optionally heated and/or optionally in a solution, to a carrier that has been optionally heated, heating a bulky ligand metallocene-type catalyst compound in a liquid, heating the carrier if not already been heated, and combining the heated bulky ligand metallocene-type catalyst compound to the heated carrier; and (3) heating a bulky ligand metallocene catalyst compound solution; adding an activator to the heated solution; and then combining the heated solution with a carrier that has been optionally heated. In these embodiments, "heating" or "heated" means that what is "heated" or "heating" is maintained at substantially the same temperature "heated" or "heating" to.

In one embodiment the invention is directed to a supported catalyst composition comprising a bulky ligand metallocene-type catalyst compound and an activator that have been combined at a temperature in the range of from 30° C. to 125° C., preferably from 50° C. to 110° C., more preferably from 60° C. to 100° C., most preferably from 75° C. to 100° C. The supported catalyst composition in one embodiment is dried or substantially dried to a free flowing powder composition for use in a polymerization or prepolymerization process as described later in this patent specification. In yet another embodiment, the free flowing composition is reslurried in a liquid such as mineral oil, toluene, or any the hydrocarbon prior to combining with the additional bulky ligand metallocene-type catalyst compound.

In another embodiment, the supported bulky ligand metallocene-type catalyst system of the invention particularly in a gas phase process has a productivity greater than 4000 grams of polymer per gram of catalyst, preferably greater than 5000 grams of polymer per gram of catalyst, more preferably greater than 6000 grams of polymer per gram of catalyst and most preferably greater than 7000 grams of polymer per gram of catalyst.

The preferred bulky ligand metallocene-type catalyst compounds are those having a low solubility in toluene, for example, less than 20 weight percent, preferably less than 15 weight percent, more preferably less than 10 weight percent, even more preferably less than 5 weight percent and most preferably less than about 3 weight percent, of the bulky ligand metallocene-type catalyst compound in toluene at room temperature (25° C.).

Polymerization Process

The supported catalyst systems or compositions of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference A preferred process of the invention is where the process, preferably a slurry or gas phase process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene-type catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene-type catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Density is measured in accordance with ASTM-D-1238.

$I_2$ is measured by ASTM-D-1238-E.

$I_{21}$ is measured by ASTM-D-1238-F.

The Fouling Index in the Tables below illustrates operability of the catalyst. The higher the value the greater the fouling observed. A Fouling Index of zero means substantially no or no visible fouling. A Fouling Index of 1 is indicative of light fouling, where a very light partial coating of polymer on the stirrer blades of a 2 liter slurry isobutane polymerization reactor and/or no reactor body sheeting. A Fouling Index of 2 is indicative of more than light fouling, where the stirrer blades have a heavier, painted-like, coating of polymer and/or the reactor body wall has some sheeting in a band of 1 to 2 inches (2.54 to 5.08 cm) wide on the reactor wall. A Fouling Index of 3 is considered medium fouling, where the stirrer blade has a thicker, latex-like, coating of polymer on the stirrer blade, some soft chunks in the reactor, and/or some reactor body sheeting with a band of 2 to 3 inch (5.08 to 7.62 cm) wide on the reactor wall. A Fouling Index of 4 is evidence of more than medium fouling, where the stirrer has a thick, latex-like, coating, some harder chunks/balls of polymer, and/or the reactor body wall sheeting band is from 3 to 4 inches (7.62 to 10.2 cm) wide.

Activity in the Tables below is measured in grams of polyethylene(PE) per gram of polymerization catalyst-hour (gPE/gCat.h).

Example 1

Into a 2 gallon (7.6 L) jacketed reactor was added 449 g, 7.74 moles of 30 wt % methylaluminoxane (MAO) (available from Albemarle Corporation, Baton Rouge, La.). Toluene (2 L) was then added to the reactor while stirring, followed by the addition of 22.0 g of silacyclopentyl (tetra-methyl-cyclopentadienyl) (cyclopentadienyl) zirconium dichloride ("the bridged bulky ligand metallocene-type catalyst compound"), dissolved in 250 ml of toluene, forming the metallocene solution. The mixture was stirred for 1 hour ("Mixing Time") at 68° C. ("Mixing Temperature"). Davison 948 silica (Davison 948 is available from W. R. Grace, Davison Division, Baltimore, Md.) was dehydrated at 600° C. and used as a support. The Davison 948 silica (1000 g) was added slowly to the MAO/metallocene solution, allowing time for good mixing and distribution of the solids into the liquid. After all of the silica was added, the slurry was mixed for an additional 20 minutes at 49° C. A 10% toluene solution of Kemamine AS-990 (available from Witco Corporation, Memphis, Tenn.) (30.2 g) was finally added to the reactor and the mixture stirred for 30 min. after which the catalyst was dried at 49° C. to a free flowing solid.

Example 2

Under anaerobic conditions, into a 125 ml glass vial containing a magnetic stir bar were added 20 cm³ of toluene and 2.25 g (0.039 moles) of methylaluminoxane (MAO) (available from Albemarle Corporation, Baton Rouge, La.) as a 30 wt % solution in toluene. While stirring 0.11 g of silacyclopentyl (tetra-methyl-cyclopentadienyl) (cyclopentadienyl) zirconium dichloride and 2 cm³ of toluene were added to the vial. The mixture was stirred for 20 min. at 25° C. after which 5 grams of Davison 948 silica (dehydrated at 600° C.) (available from W. R. Grace, Davison Division, Baltimore, Md.) was added and stirring continued for 15 more minutes. Kemamine AS-990 (0.15 grams) (available from Witco Corporation, Memphis, Tenn.) in 2 ml of toluene was finally added and mixed for 10 min. at room temperature. Finally the mixture was dried at 75° C. to a free flowing solid.

Example 3

As in Example 2 with the exception that Crosfield ES-70 grade silica (available from Crosfield Limited, Warrington, England) was used instead of Davison 948 silica.

Example 4

Under anaerobic conditions, into a 125 ml Serum vial with a stir bar, were added 20 ml of toluene and 2.25 g (0.039 moles) of MAO (available from Albemarle Corporation, Baton Rouge, La.) as a 30 wt % toluene solution. While stirring 0.11 g of the same bridged bulky ligand metallocene-type catalyst compound used in Example 2 was added to the MAO solution and the mixture heated in an oil bath, equilibrated at 65° C., for 1 hour. Silica (600° C.), 5.0 g, of Crosfield ES-70 grade (available from Crosfield Limited, Warrington, England), was poured into the solution while the temperature was at 65° C. The slurry was allowed to react for 60 minutes at 65° C. after which the catalyst was dried to a free flowing solid. To the free flowing solid 3 weight percent of Witco Aluminum Stearate #22 (AlSt #22) $(CH_3(CH_2)_{16}COO)_2Al$—OH available from Witco Corporation, Memphis, Tenn., was dried under vacuum at 85° C. and was added to the flask and the contents tumbled/mixed for 20 minutes at room temperature.

Example 5

In this example the same catalyst was prepared as described in Example 4 with the exception that the MAO/metallocene solution and the silica reaction temperatures were 75° C. and the catalyst was dried at 75° C. instead of 65° C.

Example 6

In this example the catalyst was prepared as described in Example 4 with the exception that the MAO/metallocene solution and the silica reaction temperatures were 85° C., the MAO/ metallocene was reacted for 15 min. and the catalyst was dried at 75° C. instead of 65° C.

Example 7

As in Example 6 except that reaction temperatures were 100° C. and drying temperature was 75° C.

Example 8

As in Example 7 except that reaction temperatures were 120° C. and drying temperature was 75° C.

Polymerization for Examples 1 to 8

A 2 liter autoclave reactor under a nitrogen purge was charged with 0.16 mmoles triethylaluminum (TEAL), followed by 40 cc of hexene-1 comonomer and 800 cc of isobutane diluent. The contents of the reactor were heated to 80° C., after which, 100 mg of each of the supported polymerization catalysts prepared above in Example 1 to 8, were each separately polymerized as follows: Each polymerization catalyst was introduced concurrently with ethylene into the reactor to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield. Table 1 below provides the yield data, as well as the fouling characteristics observed, and other physical properties of the polymers.

TABLE 1A

| Example | Mixing Temperature (° C.) | Mixing Time (minutes) | Fouling Index | Yield (g) | Activity |
|---|---|---|---|---|---|
| 1 | 68 | 60 | 0 | 53 | 795 |
| 2 | 25 | 20 | 1.0 | 58 | 870 |
| 3 | 25 | 20 | 2.0 | 64 | 960 |

TABLE 1B

| Example[1] | Mixing Temperature (° C.) | Mixing Time (minutes) | Yield[2] (g) | Fouling Index | $I_2$ (dg/min) | $I_{21}/I_2$ |
|---|---|---|---|---|---|---|
| 4 | 65 | 60 | 115 | 2 | 0.60 | 56 |
| 5 | 75 | 60 | 175 | 1.0 | 0.44 | 62 |
| 6 | 85 | 15 | 192 | 0.5 | 0.16 | 106 |
| 7 | 100 | 15 | 215 | 0.5 | 0.33 | 76 |
| 8 | 115 | 15 | 163 | 0.5 | 0.45 | 66 |

[1]All catalysts prepared on ES-70 silicas dried at 75° C., and blended with 3% MPS-1
[2]Isobutane slurry polymerization conditions using 40 ml hexene-1 as comonomer.

These examples show that by heating the MAO/metallocene between 75° C. to 100° C. both activity and fouling characteristics of the catalyst are improved.

Example 9

Into a 125 ml glass vial was added 15 ml of dried and sparged toluene followed by the addition of 6.2 g of a 30 wt % MAO solution (available from Albemarle Corporation, Baton Rouge, La.) in toluene equivalent to 0.032 moles of Al. While stirring, 0.123 grams of dimethylsilyl-bis (tetrahydroindenyl) zirconium dichloride was added to the vial and the mixture brought to 85° C. at which temperature it was stirred for 15 minutes. Silica Crosfield ES-70 (available from Crosfield Limited, Warrington, England) dehydrated at 600° C. was then added to the vial and the slurry mixed for an additional 15 min. at 85° C. under a nitrogen purge.

Comparative Example 10 (CEX 10)

Into a 125 ml glass vial was added 15 ml of dried and sparged toluene followed by the addition of 6.2 g of a 30 wt % MAO solution (available from Albemarle Corporation, Baton Rouge, La.) in toluene equivalent to 0.032 moles of Al. While stirring, 0.123 g of dimethylsilyl-bis (tetrahydroindenyl) zirconium dichloride was added to the vial and the mixture was allowed to stir for 15 min. at room temperature. Silica Crosfield ES-70 (available from Crosfield Limited, Warrington, England) dehydrated at 600° C. was then added to the vial and the slurry mixed for an additional 15 min. at room temperature. The catalyst was then dried to a free flowing solid at 75° C. ("Drying Temperature").

The polymerizations for Example 9 and Comparative Example 10 were the same as described above.

TABLE 2

| Example | Mixing Temperature (° C.) | Mixing Time (minutes) | Drying Temperature (° C.) | Yield (g) | Activity |
|---|---|---|---|---|---|
| 9 | 85 | 15 | 85 | 175 | 2625 |
| CEX 10 | 25 | 15 | 75 | 122 | 1830 |

Comparative Example 10 is a control preparation showing normal activity. The method of the invention utilized in Example 9 exhibited 43% higher activity.

Example 11

Into a 10 gallon (44 L) reactor was added 4988 g (25.8 moles MAO) of a 30 wt % solution of MAO (available from Albemarle Corporation, Baton Rouge, La.). Dried and sparged toluene (9.0 L) was then added followed by a solution of 93.2 g of dimethylsilylbis (tetrahydroindenyl) zirconium dichloride in 1 L of toluene. The reaction mixture was heated to 85° C. and kept at this temperature for 1 hour while stirring. Crosfield ES-70 silica dehydrated at 600° C. (available from Crosfield Limited, Warrington, England) was used as a support. The silica 4.0 kg was added slowly to the MAO/metallocene solution, allowing time for good mixing and complete distribution of the solids into the liquid. After all of the silica was added, the slurry was mixed for an additional 60 minutes at 85° C. The catalyst was then dried to a free flowing solid at 85° C. under vacuum.

Example 12

Into a 10 gallon (44 L) reactor was added 3991 g (20.6 moles) of a 30 wt % solution of MAO (available from Albemarle Corporation, Baton Rouge, La.). Dried and sparged toluene (10.0 L) was then added, followed by a solution of 74.6 g of dimethylsilyl bis (tetrahydroindenyl) zirconium dichloride in 1 L of toluene. The reaction mixture was heated to 85° C. and kept at this temperature for 1 hour while stirring.

Example 13

The catalyst in this example was prepared as in Example 11 with the exception that in this example 4489 g (23.2 moles MAO) of a 30 wt % MAO solution (available from Albemarle Corporation, Baton Rouge, La.), 9.5 L of toluene and 65.2 g of dimethylsilyl bis-(tetrahydroindenyl) zirconium dichloride was used.

Comparative Example 14 (CEX 14)

This catalyst was prepared as in Example 11 with the exception that the MAO/metallocene reaction temperature was kept at 25° C. and drying was conducted at 68° C.

The polymerizations for the supported catalyst systems of Examples 11 to 13 and Comparative Example 14 were as described above.

TABLE 3

| Example | Mixing Temperature (° C.) | Mixing Time (Min) | MAO (wt %) | Metallocene (wt %) | Activity |
|---|---|---|---|---|---|
| 11 | 85 | 60 | 100 | 100 | 2855 |
| 12 | 85 | 60 | 80 | 80 | 2700 |
| 13 | 85 | 60 | 90 | 70 | 2500 |
| CEX 14 | 25 | 60 | 100 | 100 | 1800 |

Examples 11, 12 and 13 illustrate that metal loadings on the catalyst can be reduced using the method of the invention, thus, providing a substantial cost advantage. Even more importantly, the activity is retained relative to room temperature catalyst of Comparative Example 14.

Example 15

In a 125 ml glass vial equipped with a stirring bar and under anaerobic conditions was added 20 ml of toluene, 6.64 ml of a 30 wt % methylaluminoxane (MAO) solution (2.25 g MAO, 0.039 moles) (available from Albemarle Corporation, Baton Rouge, La.). While stirring, 0.136 g of bis (1-methyl-3-n-butyl cyclopentadienyl) zirconium dichloride dissolved in 2 ml of toluene were added to the glass vial. The mixture was stirred at room temperature (25° C.) for 15 minutes, after which 5 g of silica of Davison 948 silica (dehydrated at 600° C.) (available from W. R. Grace, Davison Division, Baltimore, Md.) was added to the solution. The mixture was then stirred for 15 minutes after which it was dried at 75° C. until the solid was free flowing.

Example 16

The catalyst was prepared as in Example 15 with the exception that the pre-mix solution reaction and the silica/pre-mix reaction were conducted at 100° C. for 15 minutes instead of at room temperature. All other conditions were the same as in Example 15.

The supported catalyst systems prepared in Example 15 and 16 were then used in the polymerization process described above for Examples 1 to 14 except that 20 ml of hexene-1 was used.

TABLE 5

| Example | Mixing Temperature (° C.) | Mixing Time (Min) | Silica Reaction Temperature (° C.) | Yield (grams) | Fouling Index |
|---|---|---|---|---|---|
| 15 | 25 | 15 | 25 | 199 | 0 |
| 16 | 100 | 15 | 100 | 157 | 0 |

Examples 15 and 16 illustrate that this specific unbridged metallocene catalyst while does not show any fouling, the overall yield is lower where the silica was heated to a higher temperature. While not wishing to be bound to any theory it is suspected that one contributing factor is the solubility difference between the catalyst compounds used in Example 15 versus Example 1 and Example 11.

While the present invention has been described and illustrated by reference to particular embodiments, those of ordinary skill in the art will appreciate that the invention lends itself to variations not necessarily illustrated herein. For example, it is contemplated that two or more supported catalyst compositions of the invention can be used. Also, that two or more bulky ligand metallocene-type catalyst compounds having different solubilities can be supported using the method of the invention. For this reason, then, reference should be made solely to the appended claims for purposes of determining the true scope of the present invention.

We claim:

1. A process for polymerizing olefin(s) in the presence of a supported catalyst system, the process comprising:

(a) heating a composition comprising a bulky ligand metallocene-type catalyst compound to a temperature of from 60° C. to 100° C., (b) combining the heated composition of step a with a carrier to form the supported catalyst, and (c) polymerizing olefins in the presence of the supported catalyst.

2. The process of claim 1 wherein the bulky ligand metallocene-type catalyst compound and an activator are reacted together to form a reaction product, the reaction product is heated at a temperature of from 60° C. to 100° C., and the reaction product and a carrier are combined to form the supported catalyst.

3. The process of claim 1 wherein the bulky ligand metallocene-type catalyst compound is heated to a first temperature, the carrier is heated to a second temperature and then the bulky ligand metallocene-type catalyst compound and the carrier are combined at a third temperature.

4. A process for polymerizing olefin(s) in the presence of a supported catalyst system, the process comprising (a) heating a solution comprising at least one bulky ligand metallocene-type catalyst compound and an activator at a temperature in the range of from 60° C. to 100° C.; (b) introducing a carrier to the solution to form a mixture; (c) drying the mixture to form the supported catalyst; and (d) polymerizing olefin(s) in the presence of the supported catalyst.

5. The process of claim 4 wherein the process is a continuous gas phase process.

6. The process of claim 4 wherein the carrier is heated.

7. The process in accordance with claim 2 wherein the carrier is heated at a temperature of from 40° C. to 100° C. prior to contact with the reaction product.

* * * * *